(12) United States Patent
Tseng et al.

(10) Patent No.: US 11,341,628 B2
(45) Date of Patent: May 24, 2022

(54) METHOD FOR COMPENSATING DESIGN IMAGE OF WORKPIECE AND SYSTEM FOR PROCESSING DESIGN IMAGE OF WORKPIECE

(71) Applicant: INDUSTRIAL TECHNOLOGY RESEARCH INSTITUTE, Hsinchu (TW)

(72) Inventors: Shau-Yin Tseng, Hsinchu County (TW); Yan-Jen Su, Taoyuan (TW); Jin-Nan Liu, Tainan (TW); Chien-Wei Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 263 days.

(21) Appl. No.: 16/853,607

(22) Filed: Apr. 20, 2020

(65) Prior Publication Data
US 2021/0192711 A1    Jun. 24, 2021

(30) Foreign Application Priority Data
Dec. 20, 2019   (TW) ................................ 108146915

(51) Int. Cl.
G06T 7/33   (2017.01)
G06T 7/00   (2017.01)
G06T 7/60   (2017.01)

(52) U.S. Cl.
CPC .............. *G06T 7/0004* (2013.01); *G06T 7/33* (2017.01); *G06T 7/60* (2013.01); *G06T 2207/30141* (2013.01); *G06T 2207/30164* (2013.01)

(58) Field of Classification Search
CPC ........... G06T 7/0004; G06T 7/33; G06T 7/60; G06T 2207/30141; G06T 2207/30164;
(Continued)

(56) References Cited

U.S. PATENT DOCUMENTS 5,134,664 A * 7/1992 Clough ................ H05K 13/081
382/218
5,495,535 A * 2/1996 Smilansky ............... H04N 7/18
382/294
(Continued)

FOREIGN PATENT DOCUMENTS

CN    101489353 A    7/2009
CN    101668389 B    3/2010
(Continued)

OTHER PUBLICATIONS

TW Office Action in Application No. 108146915 dated Aug. 26, 2020.
(Continued)

*Primary Examiner* — Sheela C Chawan
(74) *Attorney, Agent, or Firm* — Maschoff Brennan (57) ABSTRACT

A method for compensating a design image of a workpiece and a system for processing the design image of the workpiece are disclosed. The method includes the following steps. Obtaining a real image of the workpiece, with the real image having registration holes. Calculating a slope value for each of the registration holes. Determining an amount of interpolation points between each two neighboring registration holes of the registration holes according to the slope value corresponding to each of the registration holes. Obtaining positions of control points in blocks formed by the registration holes. Compensating the design image of the workpiece according to positions of the registration holes, positions of the plurality of interpolation points and the positions of the control points for generating a mapping image. Outputting the mapping image adapted to be mapped onto the workpiece. The system, together with the method, will be introduced.

11 Claims, 11 Drawing Sheets (58) Field of Classification Search
CPC ..... G06T 3/0068; G06T 3/4023; G06F 30/39; G06F 2115/12
USPC ....... 382/100, 141, 143, 144, 145, 147, 149, 382/151, 152, 190, 199, 216, 275, 294, 382/300
See application file for complete search history.

(56) References Cited

U.S. PATENT DOCUMENTS

| | | | |
|---|---|---|---|
| 6,268,920 | B1 * | 7/2001 | Ohlig ................ G03F 9/00 356/399 |
| 8,137,875 | B2 * | 3/2012 | Sjostrom ............ G03F 9/7003 430/30 |
| 2001/0001840 | A1 * | 5/2001 | Lichtenstein ...... G05B 19/4086 700/192 |
| 2006/0039590 | A1 | 2/2006 | Lachine et al. |
| 2006/0234424 | A1 | 10/2006 | Fairchild et al. |
| 2009/0067728 | A1 * | 3/2009 | Mishima ............ G06T 3/0093 382/218 |
| 2010/0085476 | A1 | 4/2010 | Hsu |
| 2011/0155424 | A1 * | 6/2011 | Noy .................... H05K 3/4679 174/250 |

FOREIGN PATENT DOCUMENTS

| | | |
|---|---|---|
| CN | 102036511 B | 4/2011 |
| CN | 103008711 A | 4/2013 |
| CN | 103747617 B | 4/2014 |
| CN | 105636345 A | 6/2016 |
| CN | 108305231 A | 7/2018 |
| CN | 108780571 A | 11/2018 |
| TW | 200608796 A | 3/2006 |
| TW | 200948248 | 11/2009 |
| TW | 201016000 A | 4/2010 |
| TW | 201801603 | 1/2018 |

OTHER PUBLICATIONS

Dong, Wang, Tang Shijie, and Lv Yuanchang. "An automatic 3d face mesh transform based on point matching and its application." 2010 International Conference on Intelligent Computing and Integrated Systems. IEEE, 2010.

Duanduan, Yang, and Andrzej Sluzek. "Aligned matching: an efficient image matching technique." 2009 16th IEEE International Conference on Image Processing (ICIP). IEEE, 2009.

Fan, Yu-Cheng, et al. "Optimal displacement control and image warping architecture for 3D vision system." 2014 IEEE/SICE International Symposium on System Integration. IEEE, 2014.

Xu, Xin, and Jia Zhang. "The method of image matching by taking every fixed match pixel." 2012 Fifth International Symposium on Computational Intelligence and Design. vol. 2. IEEE, 2012.

Yue, Guohua, and Yu Xu. "An Area Based Image Matching Algorithm and its Implementation." 2012 Third World Congress on Software Engineering. IEEE, 2012.

Zhou, Yuhao, et al. "An automatic global-to-local image registration based on SIFT and thin-plate spline (TPS)." 2013 IEEE International Geoscience and Remote Sensing Symposium-IGARSS. IEEE, 2013.

* cited by examiner

METHOD FOR COMPENSATING DESIGN IMAGE OF WORKPIECE AND SYSTEM FOR PROCESSING DESIGN IMAGE OF WORKPIECE

CROSS-REFERENCE TO RELATED APPLICATIONS

This non-provisional application claims priority under 35 U.S.C. § 119(a) on Patent Application No(s). 108146915 filed in Taiwan, R.O.C. on Dec. 20, 2019 the entire contents of which are hereby incorporated by reference.

BACKGROUND

1. Technical Field

This disclosure relates to a method for compensating a design image of a work piece and a system for processing a design image of a workpiece.

2. Related Art

In various industries, sometimes it is necessary to map a design image onto a workpiece. However, a workpiece may expand and/or shrink during manufacturing due to various factors. When any expansion or shrinkage occurs on the workpiece, the quality of the workpiece may be affected if an original design image is directly mapped onto the workpiece.

Take the industry of print circuit board (PCB) as an example for illustration. Due to the trend of a thinner and smaller PCB in the market, it results in a high-density layout and small widths of traces on a PCB. The PCB substrate may expand due to moisture absorption and shrink due to moisture desorption in the process of manufacturing, which may cause distortion of size. Accordingly, it is a way to compensate the original circuit image before mapping it onto the PCB.

SUMMARY

A method for compensating a design image of a workpiece is disclosed according to an embodiment of the present disclosure. The method includes steps of obtaining a real image of the workpiece, with the real image having a plurality of registration holes; calculating a slope value for each of the plurality of registration holes; determining an amount of interpolation points between each two neighboring registration holes of the plurality of registration holes according to the slope value corresponding to each of the plurality of registration holes; obtaining positions of a plurality of control points in a plurality of blocks formed by the plurality of registration holes, wherein each of the plurality of blocks is surrounded by first registration holes of the plurality of registration holes, each of the plurality of blocks comprises first control points of the plurality of control points, and an amount of the first control points located in each of the plurality of blocks is associated with the amount of interpolation points between the registration holes which surround the block; compensating the design image of the workpiece according to positions of the plurality of registration holes, positions of the plurality of interpolation points and the positions of the plurality of control points for generating a mapping image; and outputting the mapping image adapted to be mapped onto the workpiece.

A system for processing a design image of a workpiece is disclosed according to an embodiment of the present disclosure. The system includes a processor, a memory and a computing assembly. The processor is configured to divide the design image of the workpiece into a plurality of sub-images. The memory is coupled to the processor and configured to store the plurality of sub-images. The computing assembly is coupled to the processor and configured to compensate the plurality of sub-images according to positions of a plurality of registration holes, positions of a plurality of interpolation points and positions of a plurality of control points, and the computing assembly is further configured to store the plurality of sub-images which are compensated. The processor rearranges the plurality of sub-images which are compensated to generate a mapping image. The processor is programmed for: obtaining a real image of the workpiece, with the real image having a plurality of registration holes; calculating a slope value for each of the plurality of registration holes; determining an amount of the interpolation points of the plurality of interpolation points between each two neighboring registration holes of the plurality of registration holes according to the slope value corresponding to each of the plurality of registration holes; and obtaining the positions of the plurality of control points in a plurality of blocks formed by the plurality of registration holes, wherein each of the plurality of blocks is surrounded by first registration holes of the plurality of registration holes on the real image, each of the plurality of blocks comprises first control points of the plurality of control points, and an amount of the first control points located in each of the plurality of blocks is associated with an amount of interpolation points between the registration holes which surround the block.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
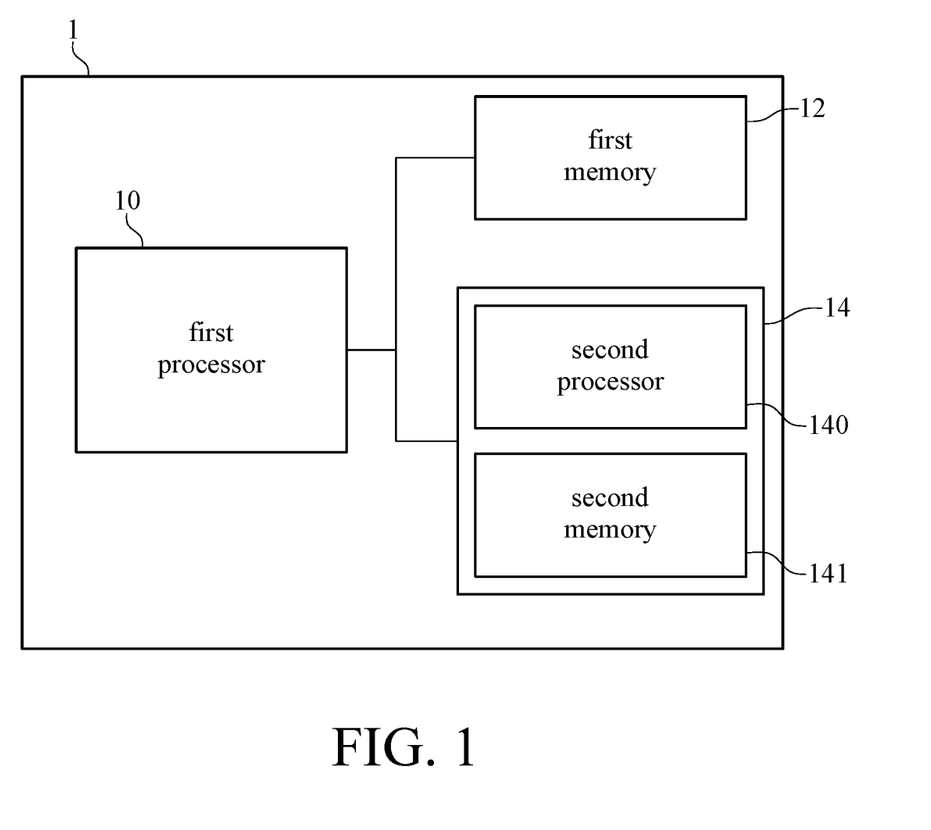
FIG. 1 is a block diagram of a system for processing a design image of a workpiece according to one embodiment of the present disclosure.
Figure 2:
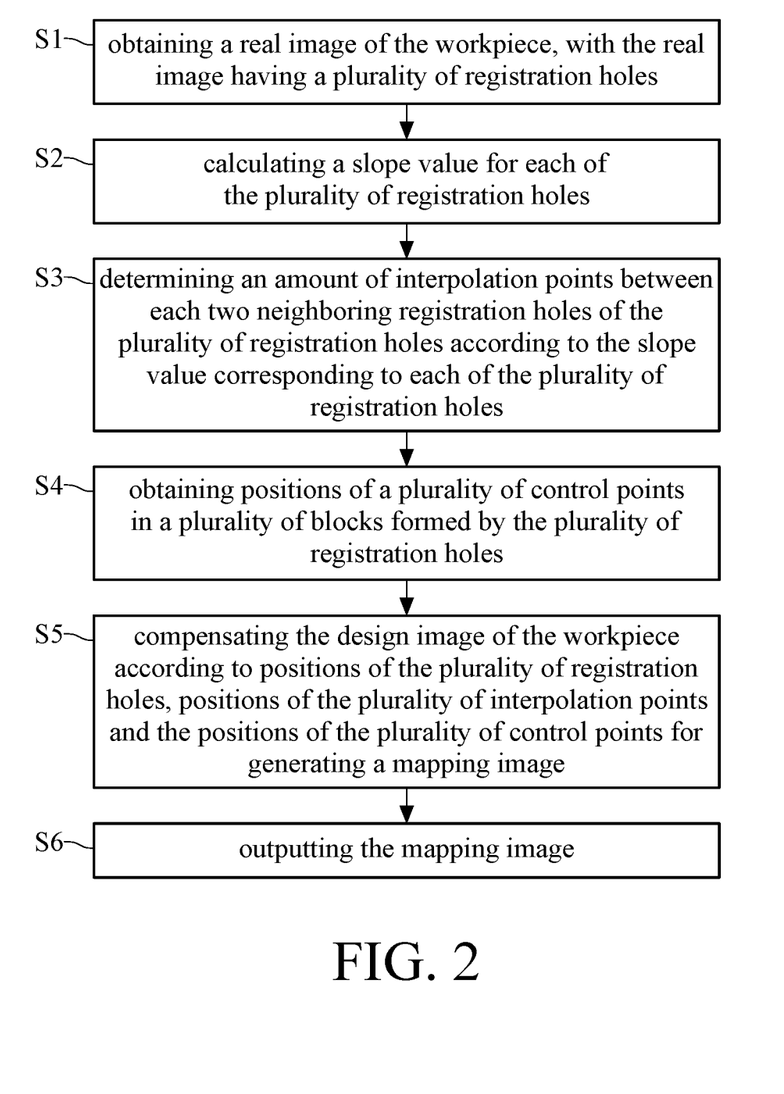
FIG. 2 is a flow chart of a method for compensating a design image of a workpiece according to one embodiment of the present disclosure.
Figure 3:
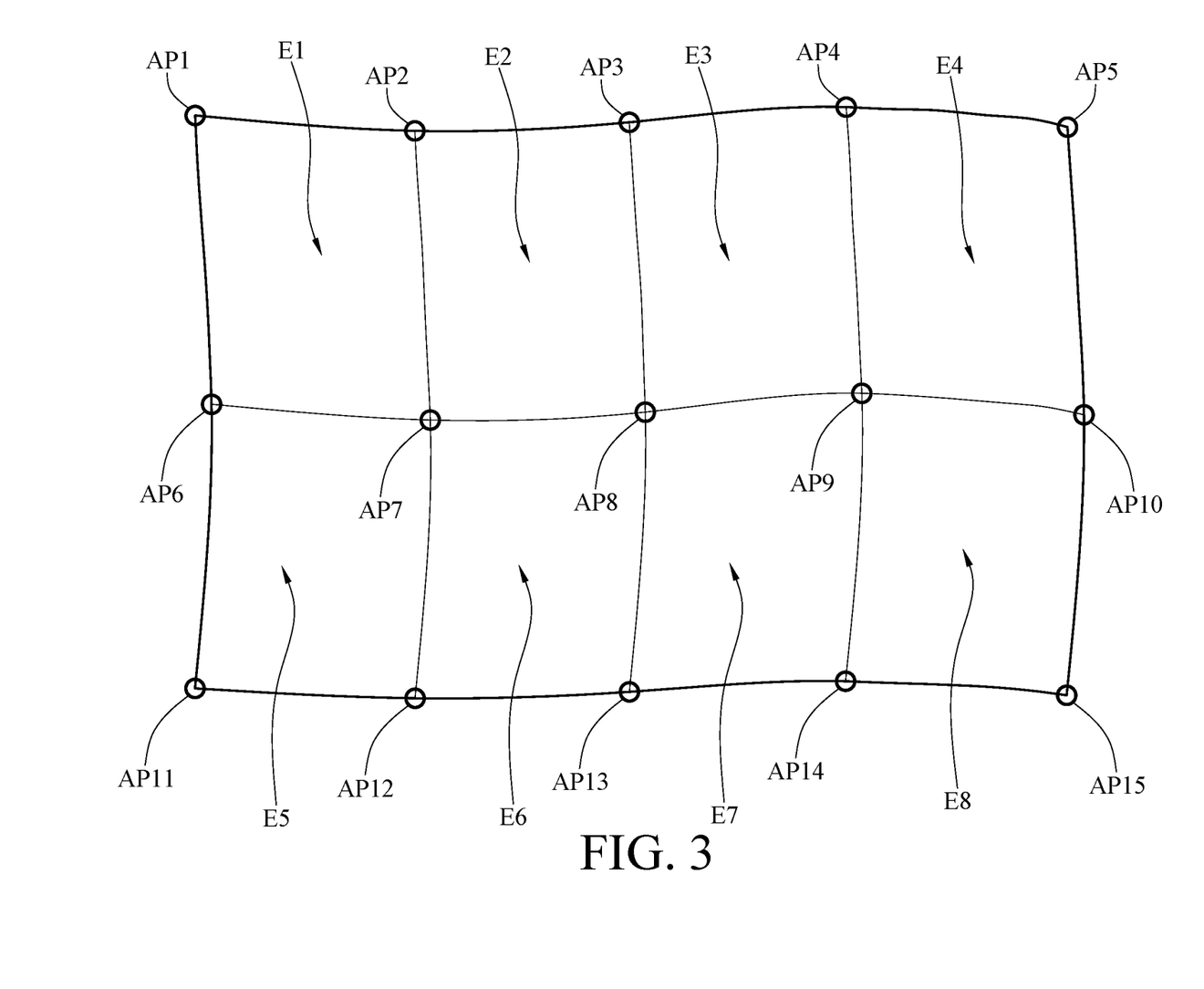
FIG. 3 is a schematic diagram of a real image of a workpiece according to one embodiment of the present disclosure.

Please refer to FIG. 1, FIG. 2 and FIG. 3. FIG. 1 is a block diagram of a system for processing a design image of a workpiece according to one embodiment of the present disclosure and FIG. 2 is a flow chart of a method for compensating a design image of a workpiece according to one embodiment of the present disclosure, wherein the method of FIG. 2 could be performed by the system (hereinafter refer to "the processing system") of FIG. 1. FIG. 3 is a schematic diagram of a real image of a workpiece according to one embodiment of the present disclosure. As shown in FIG. 1, the processing system 1 includes a first processor 10, a first memory 12 and a computing assembly 14. The first memory 12 and the computing assembly 14 are both coupled to the first processor 10. In the embodiment, the term "coupled to" stands for "directly connected" or "indirectly connected". In this embodiment of the present disclosure, the processing system 1 is, for example, a computer system, a server system or other system with computing and processing functions. The first processor 10 could be a central processing unit (CPU), and the first memory 12 could be a main memory of a server or a computer system. The computing assembly 14 includes a second processor 140 and a second memory 141, wherein the second processor 140 is, for example, a graphics processing unit (GPU), and the second memory 141 is, for example, a GPU memory. However, the present disclosure is not limited to the above embodiment. In another embodiment, the first processor 10 is a graphics processing unit while the second processor 140 is a central processing unit.

For the purpose of convenience of illustrating the method for compensating the design image of the workpiece disclosed in the present disclosure, an example that the workpiece refers to a PCB will be given in the following paragraphs. However, it is noted that the workpiece is not necessary a PCB. First of all, in step S1, the first processor 10 obtains a real image of the workpiece as shown in FIG. 3, wherein the real image has a plurality of registration holes AP1-AP15. The real image could be an image of a distorted workpiece (PCB) which is obtained from an experimental machine or a simulation machine, wherein the registration holes AP1-AP15 correspond to registration holes of the workpiece (PCB). In one embodiment, the distortion is expansion and/or shrinkage. In this embodiment, before the distortion of the workpiece occurs, the above-mentioned registration holes are points which surround a plurality of rectangular blocks. However, in another embodiment, the registration holes are points which surround triangular blocks or polygonal blocks. The present disclosure is not limited to the above embodiment. As shown in FIG. 3, the real image is divided into distorted blocks E1-E8 by the registration holes AP1-AP15.

In step S2, the first processor 10 calculate a slope value of each of the registration holes. In one embodiment, the first processor 10 obtains coordinates of each of the registration holes AP1-AP15, and then calculates a plurality of polynomial equations with respect to the horizontal direction and the vertical direction based on the coordinates of the registration holes AP1-AP15 by using, for example, the polynomial equation with respect to the horizontal direction $y=a_n x^n + a_{n-1} x^{n-1} + \ldots + a_2 x^2 + a_1 x^1 + a_0$ and the polynomial equation with respect to the vertical direction $x=b_n y^n + b_{n-1} y^{n-1} + \ldots + b_2 y^2 + b_1 y^1 + b_0$. By using each of those polynomial equations with respect to the horizontal direction and the vertical direction, the first processor 10 is capable of calculating the slope value of each of the registration holes with respect to the horizontal direction and the vertical direction.

For example, the first processor 10 calculates a polynomial equation with respect to the horizontal direction according to the coordinates of the registration holes AP1-AP5. Then, the first processor 10 performs a first-order differentiation to the polynomial equation and further inputs the coordinates of each of the registration holes AP1-AP5 into the first-order differentiated polynomial equation for obtaining the slope values of the registration holes AP1-AP5 with respect to the horizontal direction. The calculation of the slope values for other registration holes AP6-AP10 and AP11-AP15 in the horizontal direction can be refer to the above example, not repeated herein.

Furthermore, the first processor 10 also calculates a polynomial equation with respect to the vertical direction according to the coordinates of the registration holes AP1, AP6, AP11. Then, the first processor 10 performs a first-order differentiation to the polynomial equation and further inputs the coordinates of each of the registration holes AP1, AP6, AP11 into the first-order differentiated polynomial equation for obtaining the slope values of the registration holes AP1, AP6, AP11 with respect to the vertical direction. The calculation of the slope values for other registration holes AP2, AP7, AP12 and AP3, AP8, AP13 and AP4, AP9, AP14 and AP5, AP10, AP15 in the vertical direction can be refer to the above example, not repeated herein.

After obtaining the slope value of each registration hole with respect to the horizontal direction and the vertical direction, in step S3, the first processor 10 determines an amount of interpolation points between each two neighboring registration holes of the plurality of registration holes according to the slope value corresponding to each of the plurality of registration holes. In step S4, the first processor 10 obtains positions of a plurality of control points in a plurality of blocks formed by the plurality of registration holes. Each of the plurality of blocks is surrounded by first registration holes of the plurality of registration holes on the real image, wherein the first registration holes represent some of the plurality of registration holes on the real image. For example, the block E1 is surrounded by the registration holes AP1, AP2, AP6 and AP7, the block E2 is surrounded by the registration holes AP2, AP3, AP7 and APB, and so on. Each block includes first control points of the plurality of control points (not shown in FIG. 1), wherein the first control points represent some of the plurality of control points. An amount of first the control points in each block is associated with an amount of first interpolation points between the first registration holes which surround the block, wherein the first interpolation points represent some of the plurality of interpolation points. The contents regarding the obtaining of the interpolation points and the control points will hereafter be illustrated in detail.

After the first processor 10 obtains the positions of the plurality of control points, in step S5, the second processor 140 of the computing assembly 14 compensates the design image of the workpiece according to the positions of the registration holes, the positions of the interpolation points and the positions of the control points obtained by the first processor 10 for generating a mapping image. In one embodiment, the coordinates of the registration holes, coordinates of the interpolation points and coordinates of the control points indicates the positions where distortion occur on the image of the PCB. The second processor 140 of the computing assembly 14 reads the design image from the first memory 12 and compensates each respective point on the design image according to the coordinates of the registration holes, the coordinates of the interpolation points and the coordinates of the control points and further stores the design image which is compensated in the second memory 141. Accordingly, the first processor 10 generates the mapping image base on the compensated design image. In one embodiment, the second processor 140 of the computing assembly 14 uses, for example, Open Graphics Library (OpenGL), DirectX (Direct eXtension, DX), etc. to enable a hardware acceleration for compensating the design image, so that the computing speed may be improved. However, the present disclosure is not limited to the above embodiment. In step S6, the first processor 10 outputs the mapping image, wherein the mapping image is used for being mapped onto the workpiece. In detail, the design image, for example, is an original circuit image designed to be mapped onto the workpiece (e.g. PCB) while the mapping image is a compensated image which is generated from the process of compensation performed on the design image. That is, the mapping image is an image obtained by performing a proper process of compensation in accordance with the actual expansion and shrinkage of the workpiece. By using the compensation method, it is possible to achieve a good accuracy for the PCB without taking lots of time costs even though the design image of the PCB has high-density traces. In one embodiment, the mapping image is used to manufacture the workpiece, for example, a print circuit board or its photomask blank is manufactured by developing the mapping image in printed, etched and/or exposed ways.

Figure 4A:
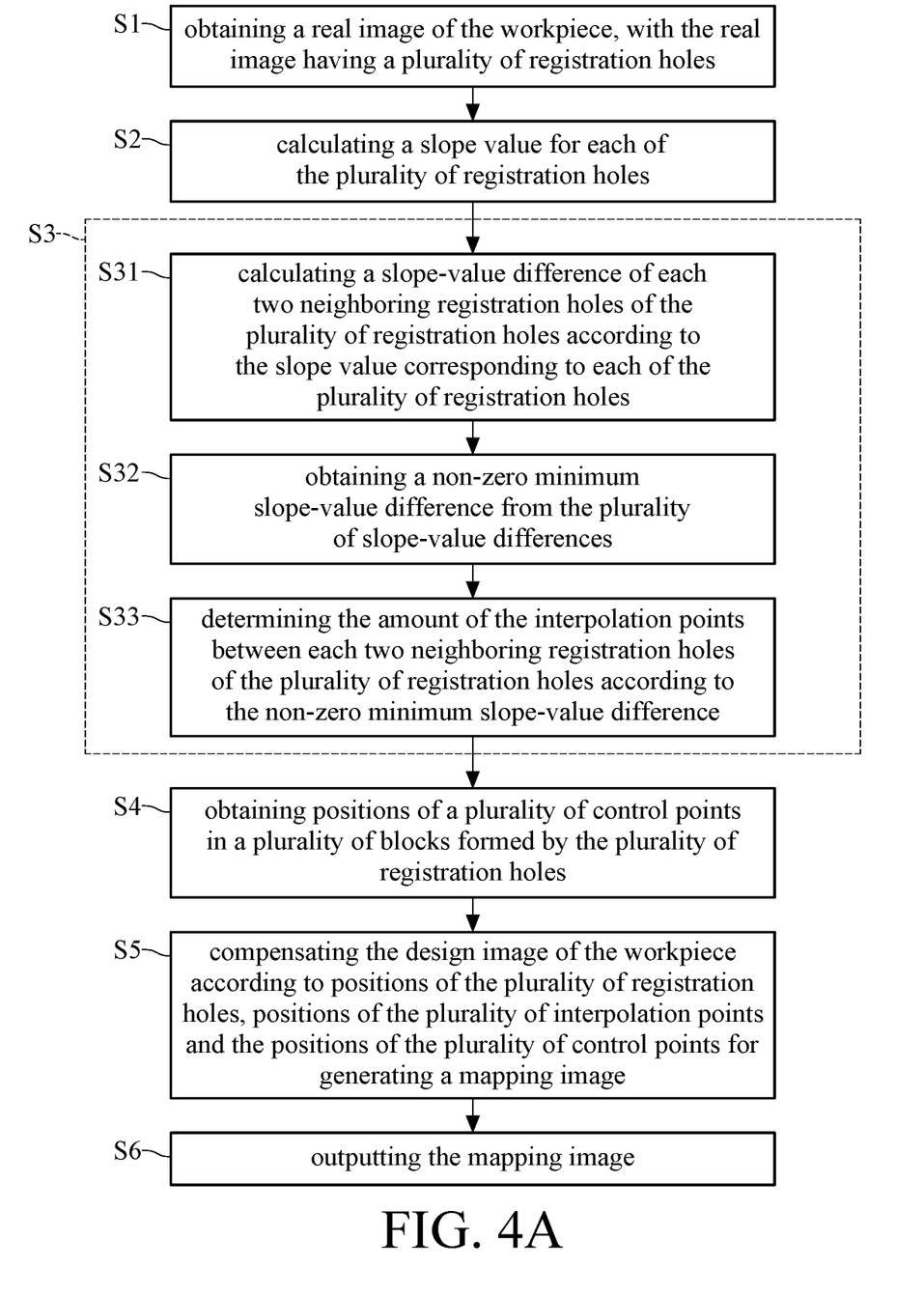
FIG. 4A is a detailed flow charts of the method for compensating the design image of the workpiece according to the embodiment shown in FIG. 2
Figure 4B:
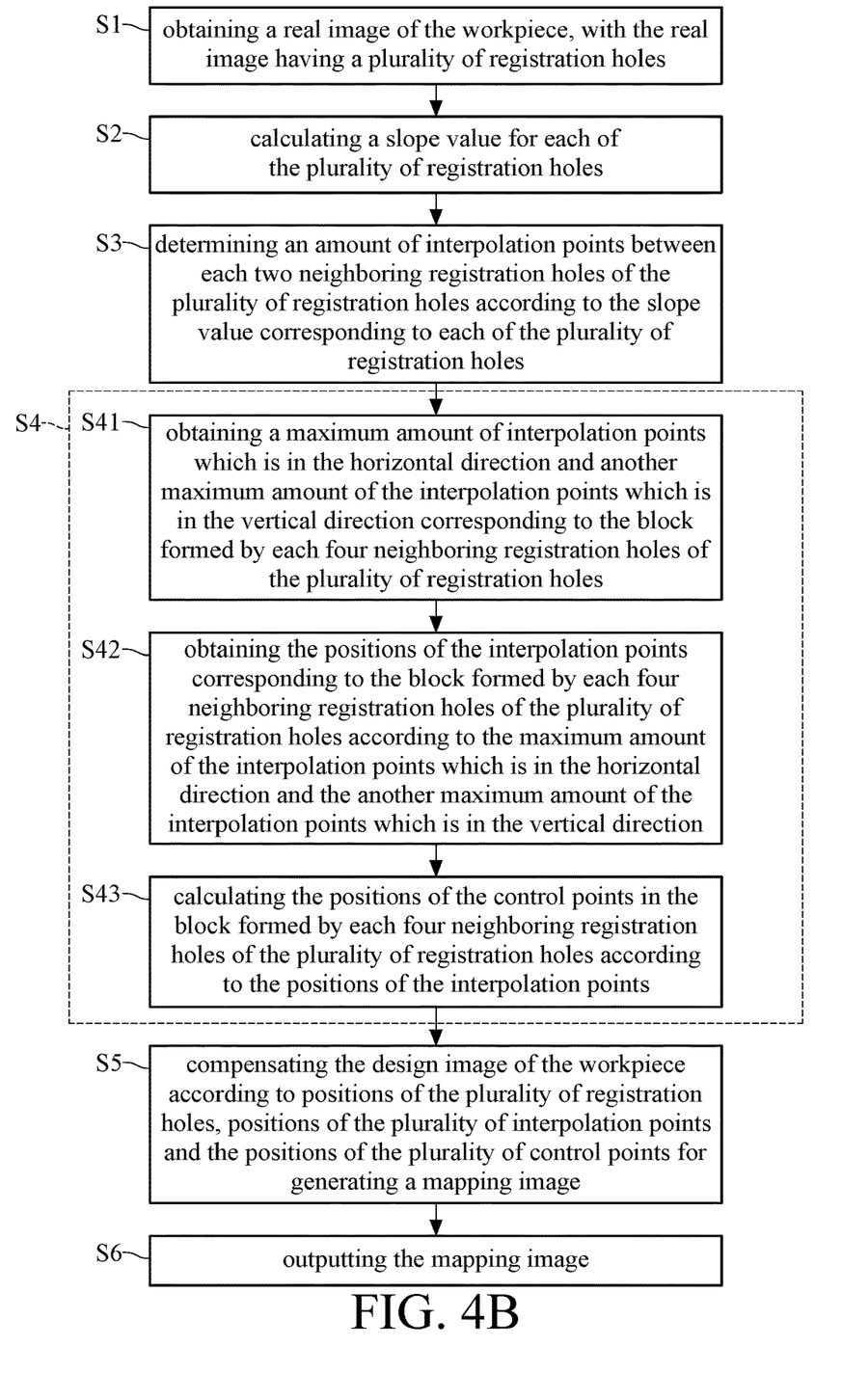
FIG. 4B is a detailed flow charts of the method for compensating the design image of the workpiece according to the embodiment shown in FIG. 2

Please further refer to FIG. 4A to FIG. 4B, which are detailed flow charts of the method for compensating the design image of the workpiece according to the embodiment shown in FIG. 2. In FIG. 4A, step S3 includes step S31 to step S33. In step S31, the first processor 10 calculates a slope-value difference of each two neighboring registration holes of the plurality of registration holes according to the slope value of each of the plurality of registration holes. In step S32, the first processor 10 obtains a non-zero minimum slope-value difference from the plurality of slope-value differences. In one embodiment, non-zero minimum slope-value difference is slope-value difference with minimum value which is not zero. For example, if there are three slope value differences which are 1, 0.5, and 0 separately, the non-zero minimum slope-value difference is 0.5. In step S33, the first processor 10 determines the amount of the interpolation points between each two neighboring registration holes of the plurality of registration holes according to the non-zero minimum slope-value difference.

In one embodiment, the first processor 10 calculates the slope values of the registration holes AP1, AP2, AP3, AP4 and AP5, which are y0', y1'. y2', y3' and y4' respectively. The first processor 10 further calculates the slope-value difference of each two registration holes. For example, the slope-value difference of the two neighboring registration holes AP1 and AP2 is $|y_0'-y_1'|$, the slope-value difference of the two neighboring registration hole AP2 and AP3 is $|y_1'-y_2'|$, the slope-value difference of the two neighboring registration holes AP3 and AP4 is $|y_2'-y_3'|$, and the slope-value difference of the two neighboring registration holes AP4 and AP5 is $|y_3'-y_4'|$.

After obtaining the slope-value difference of each two neighboring registration holes, the first processor 10 selects the non-zero minimum slope-value difference from those slope-value differences. It is assumed that the above-mentioned non-zero minimum slope-value difference is $|y_2'-y_3'|$, and the first processor 10 takes this non-zero minimum slope-value difference as a basis for determining the amount of the interpolation points between each two neighboring registration holes of the plurality of registration holes.

In one embodiment, the first processor 10 determines the amount of the interpolation points between each two neighboring registration holes of the plurality of registration holes according to the non-zero minimum slope-value difference includes dividing the slope value of each two neighboring registration holes of the plurality of registration holes by the non-zero minimum slope-value difference to determine the amount of the interpolation points between each two neighboring registration holes of the plurality of registration holes. In one embodiment, the first processor 10 divides the slope-value difference of each two neighboring registration holes by the non-zero minimum slope-value difference and converts each division result with a ceiling function (ceil(x)) to obtain an integer, so as to determine the amount of the interpolation points between each two neighboring registration holes. In the above embodiment, since the non-zero minimum slope-value difference is $|y_2'-y_3'|$, the first processor 10 calculates that the amount of the interpolation points between the registration holes AP1 and AP2 is $$\left\lceil \frac{|y_0'-y_1'|}{|y_2'-y_3'|} \right\rceil,$$

the amount of the interpolation points between the registration holes AP2 and AP3 is $$\left\lceil \frac{|y_1'-y_2'|}{|y_2'-y_3'|} \right\rceil,$$

the amount of the interpolation points between the registration hole AP3 and AP4 is $$\left\lceil \frac{|y_2'-y_3'|}{|y_2'-y_3'|} \right\rceil,$$

the amount of the interpolation points between the registration holes AP4 and AP5 is $$\left\lceil \frac{|y_3'-y_4'|}{|y_2'-y_3'|} \right\rceil.$$

The calculation for the amount of the interpolation points between other registration holes in the horizontal direction can be referred to the above-mentioned embodiment, and not repeated herein. The calculation for the amount of the interpolation points between each two neighboring registration holes in the vertical direction can be also referred to the above-mentioned embodiment, and not repeated herein.

After obtaining the amount of the interpolation points between each two neighboring registration holes, the first processor 10 further obtains the positions of the control points in each of the blocks on the real image according to the amount of the respective interpolation points. More specifically, as shown in FIG. 4B, step S4 includes step S41 to step S43. In step S41, the first processor 10 obtains a maximum amount of interpolation points which is in the horizontal direction and another maximum amount of the interpolation points which is in the vertical direction corresponding to the block formed by each four neighboring registration hole. In detail, each block has two sets of amounts of interpolation points in the horizontal direction and has the other two sets of amounts of interpolation points in the vertical direction. For example, the block E4 has the amount of the interpolation points between the registration holes AP4 and AP5 and the amount of the interpolation points between the registration holes AP9 and AP10 in the horizontal direction. The block E4 has the amount of the interpolation points between the registration holes AP4 and AP9 and the amount of the interpolation points between registration point AP5 and AP10 in the vertical direction. In further, the first processor 10 obtains the maximum amount of interpolation points in the horizontal direction by comparing the amounts of the interpolation points between the registration holes AP4 and AP5 with the amount of the interpolation points between the registration holes AP9 and AP10. The first processor 10 obtains the maximum amount of interpolation points in the vertical direction by comparing the amounts of the interpolation points between the registration holes AP4 and AP9 with the amount of the interpolation points between the registration holes AP5 and AP10.

Figure 5:
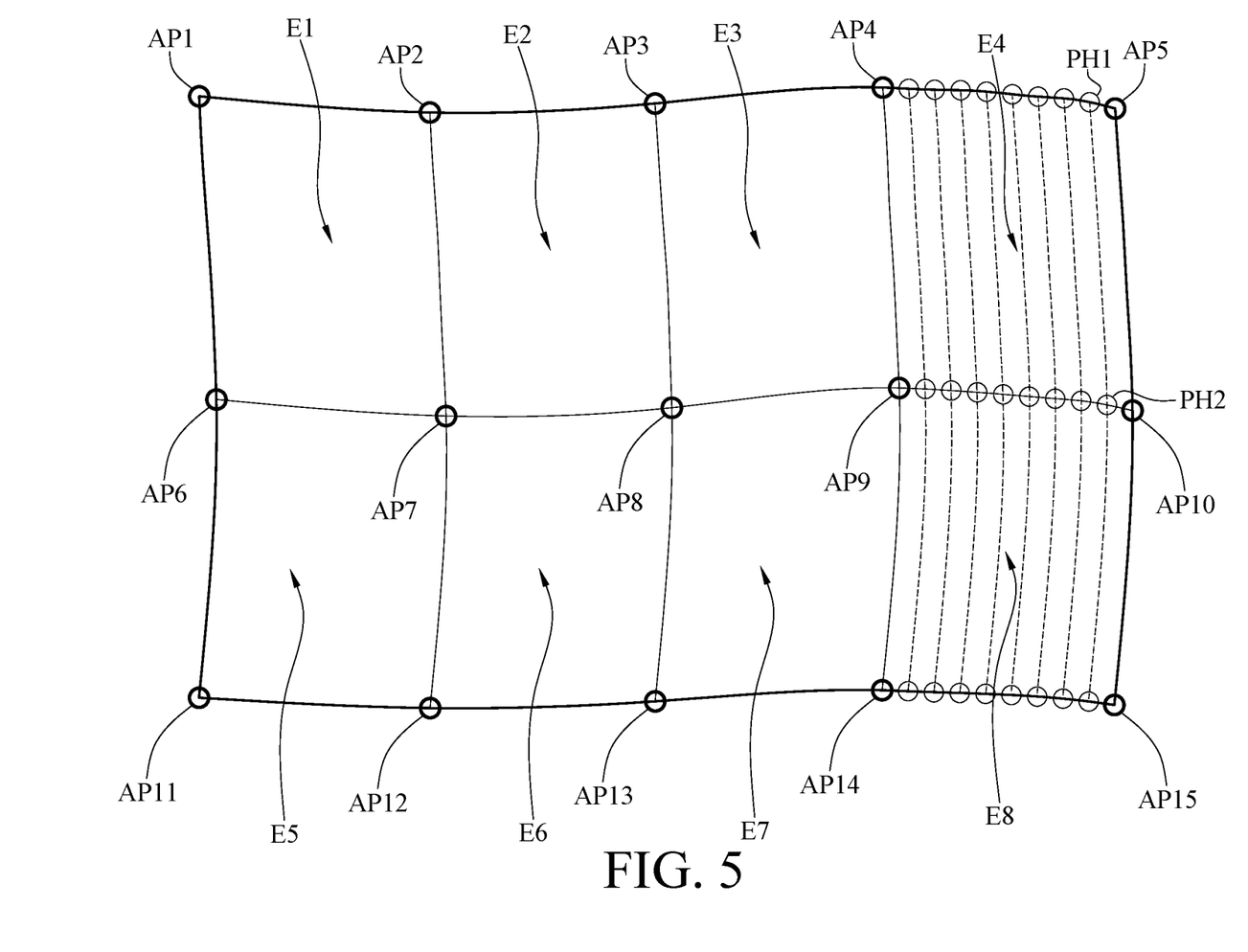
FIG. 5 is a schematic diagram of the interpolation points in the horizontal direction on the real image of the workpiece according to one embodiment of the present disclosure.
Figure 6:
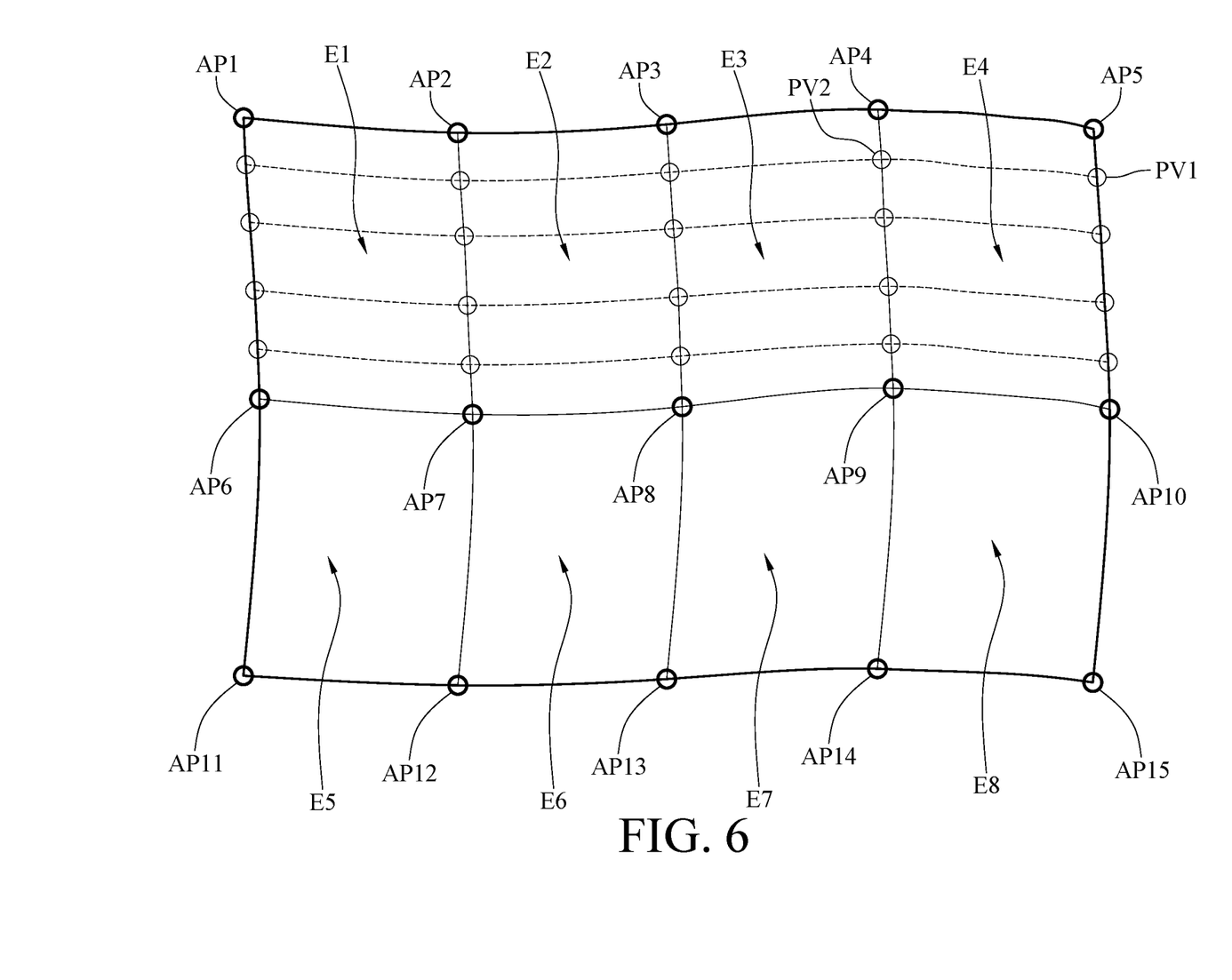
FIG. 6 is a schematic diagram of the interpolation points in the vertical direction on the real image of the workpiece according to one embodiment of the present disclosure.

The following paragraph illustrates how to obtain a maximum amount of interpolation points by taking the block E4 as an example. Please further refer to FIG. 5 and FIG. 6. FIG. 5 is a schematic diagram of the interpolation points in the horizontal direction on the real image of the workpiece according to one embodiment of the present disclosure. FIG. 6 is a schematic diagram of the interpolation points in the vertical direction on the real image of the workpiece according to one embodiment of the present disclosure. It is assumed that the first processor 10 calculates that the amount of the interpolation points between the registration holes AP4 and AP5 is four while the amount of the interpolation points between the registration holes AP9 and AP10 is eight. Accordingly, the first processor 10 would select the maximum amount of the interpolation points which is eight as the amount of the interpolation points corresponding to the block E4 in the horizontal direction, as shown in FIG. 5. In other words, for the block E4, the amount of the interpolation points between the registration holes AP4 and AP5 and the amount of the interpolation points between the registration holes AP9 and AP10 both are eight. For the purpose of simplifying the figure, only one single interpolation point (e.g. PH1) and one single interpolation point (e.g. PH2) are respectively given with reference signs in the block E4, and the rest interpolation points are not given with reference signs.

Furthermore, it is assumed that, in FIG. 6, it is assumed that the first processor 10 calculates that the amount of the interpolation points between the registration holes AP4 and AP9 is three while the amount of the interpolation points between the registration holes AP5 and AP10 is four. Accordingly, the first processor 10 would select the maximum amount of the interpolation points which is four as the amount of the interpolation points corresponding to the block E4 in the vertical direction, as shown in FIG. 6. That is, the amount of the interpolation points between the registration holes AP4 and AP9 and the amount of the interpolation points between the registration holes AP5 and AP10 both are four. Similarly, For the purpose of simplifying the figure, only one single interpolation point (e.g. PV1) and one single interpolation point (e.g. PV2) are respectively given with reference signs in the block E4, and the rest interpolation points are not given with reference signs.

The above embodiment illustrates the method to obtain the interpolation points in the horizontal direction and in the vertical direction for the block E4, and the same method can be applied to the rest blocks. After the first processor 10 determines the amount of the interpolation points in the horizontal direction and the vertical direction for each block, in step S42, the first processor 10 obtains the positions of the interpolation points corresponding to the block formed by each four neighboring registration holes according to the maximum amount of the interpolation points which is in the horizontal direction and the another maximum amount of the interpolation points which is in the vertical direction. More specifically, since these interpolation points in the horizontal direction and the vertical direction corresponding to each block are equally distributed between the two respective registration holes according to a curve of the respective polynomial equation, the first processor 10 is capable of obtaining the coordinates of the interpolation points by using the coordinates of the registration holes and the respective polynomial equation. For example, as shown in FIG. 5, the eight interpolation points PH1 are equally distributed between the two registration holes AP4 and AP5 according to the curve of the respective polynomial equation, so the first processor 10 is capable of calculating the coordinates of the eight interpolation points PH1 based on the coordinates of the registration holes AP4 and AP5. Furthermore, in FIG. 6, the four interpolation points PV1 are equally distributed between the two registration holes AP5 and AP10 according to the curve of the respective polynomial equation, so the first processor 10 is capable of calculating the coordinates of the four interpolation points PH1 based on the coordinates of the registration holes AP5 and AP10.

As described above, after the first processor 10 obtains the coordinates of the interpolation points in the horizontal direction and the vertical direction for the block E4, then in step S43, the first processor 10 calculates the positions of the control points in the block formed by each four neighboring registration holes of the plurality of registration holes according to the positions of the interpolation points. Further, please refer to FIG. 7, which is a schematic diagram of control points in one block on the real image of the workpiece according to one embodiment of the present disclosure. In this embodiment, the first processor 10 respectively calculates a plurality of horizontal polynomial equations and a plurality of vertical polynomial equations corresponding to the block formed by each four neighboring registration holes of the plurality of registration holes according to the positions of the interpolation points.

Figure 7:
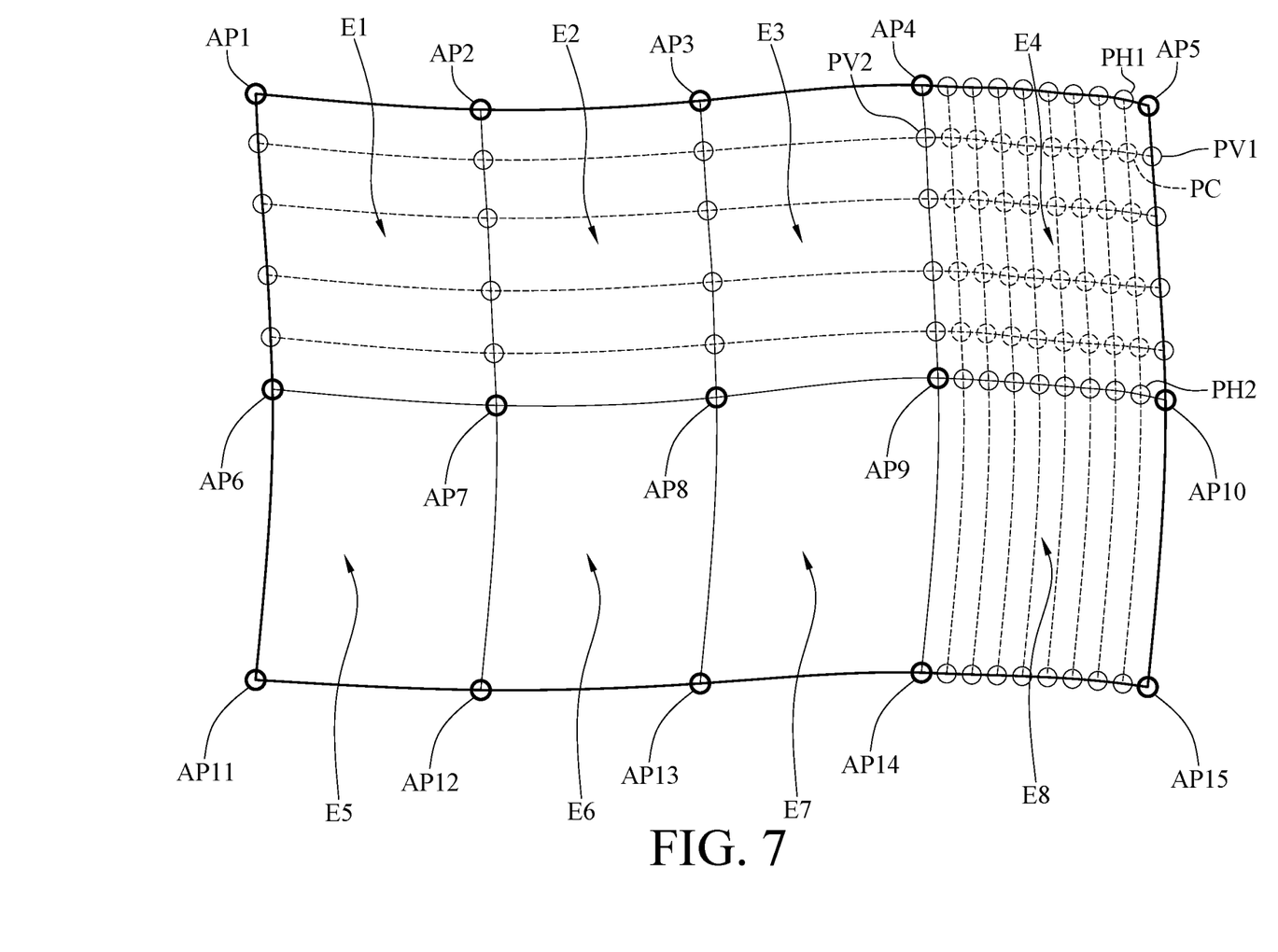
FIG. 7 is a schematic diagram of control points in one block on the real image of the workpiece according to one embodiment of the present disclosure.

The following embodiment uses the block E4 for illustration. After the first processor 10 obtains the coordinates of the plurality of interpolation points in the horizontal direction for the block E4, the first processor 10 further calculates a plurality of vertical polynomial equations according to the coordinates of the interpolation points in the horizontal direction. Furthermore, after the first processor 10 obtains the coordinates of the plurality of interpolation points in the vertical direction for the block E4, the first processor 10 further calculates a plurality of horizontal polynomial equations according to the coordinates of the interpolation points in the vertical direction.

Then, the first processor 10 obtains a plurality of intersection points of the plurality of horizontal polynomial equations and the plurality of vertical polynomial equations, as shown in FIG. 7. The positions of the plurality of intersection points indicate the coordinates of the control points (e.g. the control point PC) in the block E4. For the purpose of simplifying FIG. 7, only one single control point PC is given with a reference sign while the rest control points are not given with reference signs. The above embodiment illustrates the block E4. The first processor 10 can obtain the coordinates of the control points in each of the blocks E1-E3 and E5-E8 in the same way, so the details are not repeated herein.

Figure 8:
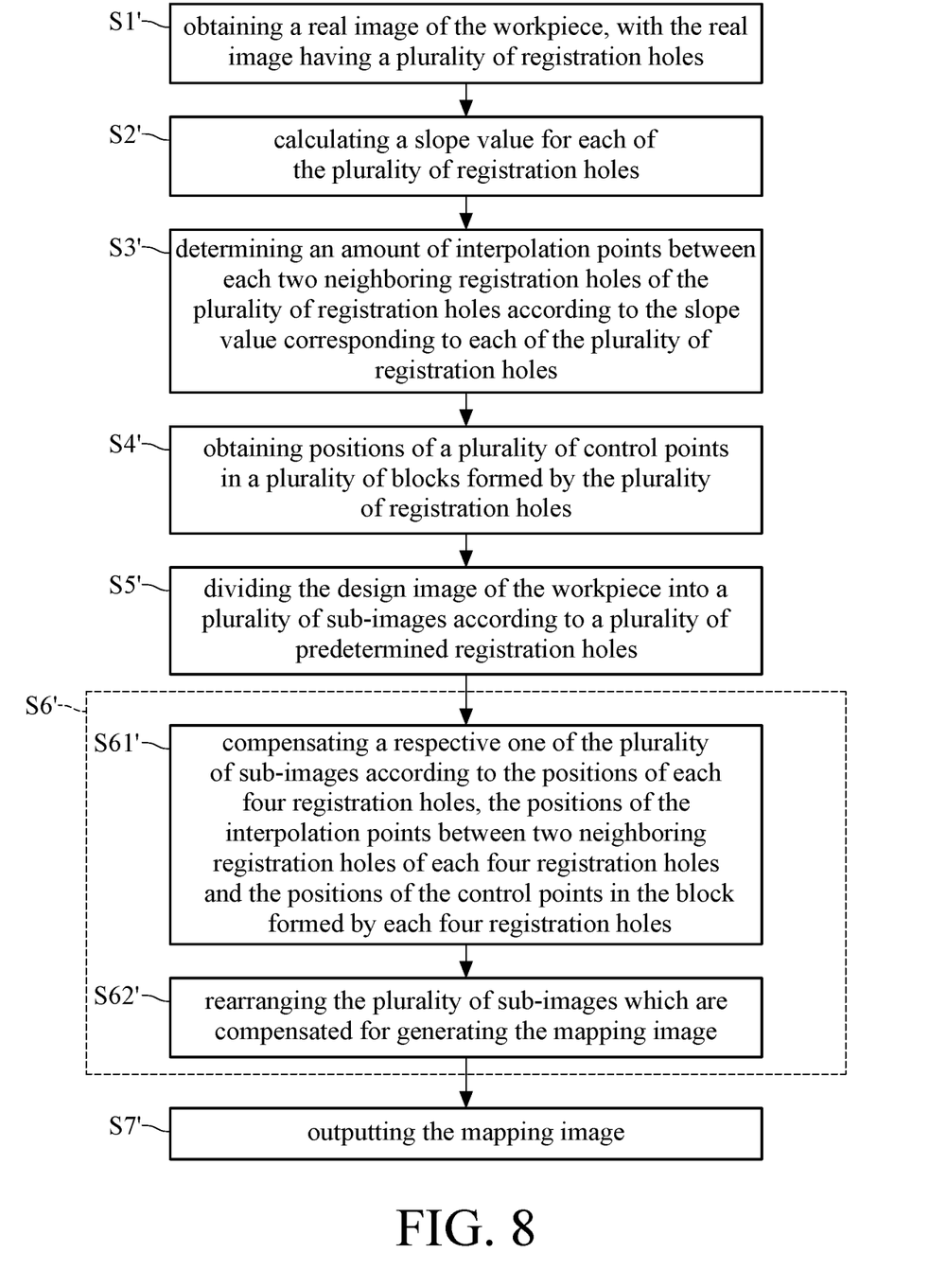
FIG. 8 is a flow chart of a method for compensating a design image of a workpiece according to another embodiment of the present disclosure.
Figure 9:
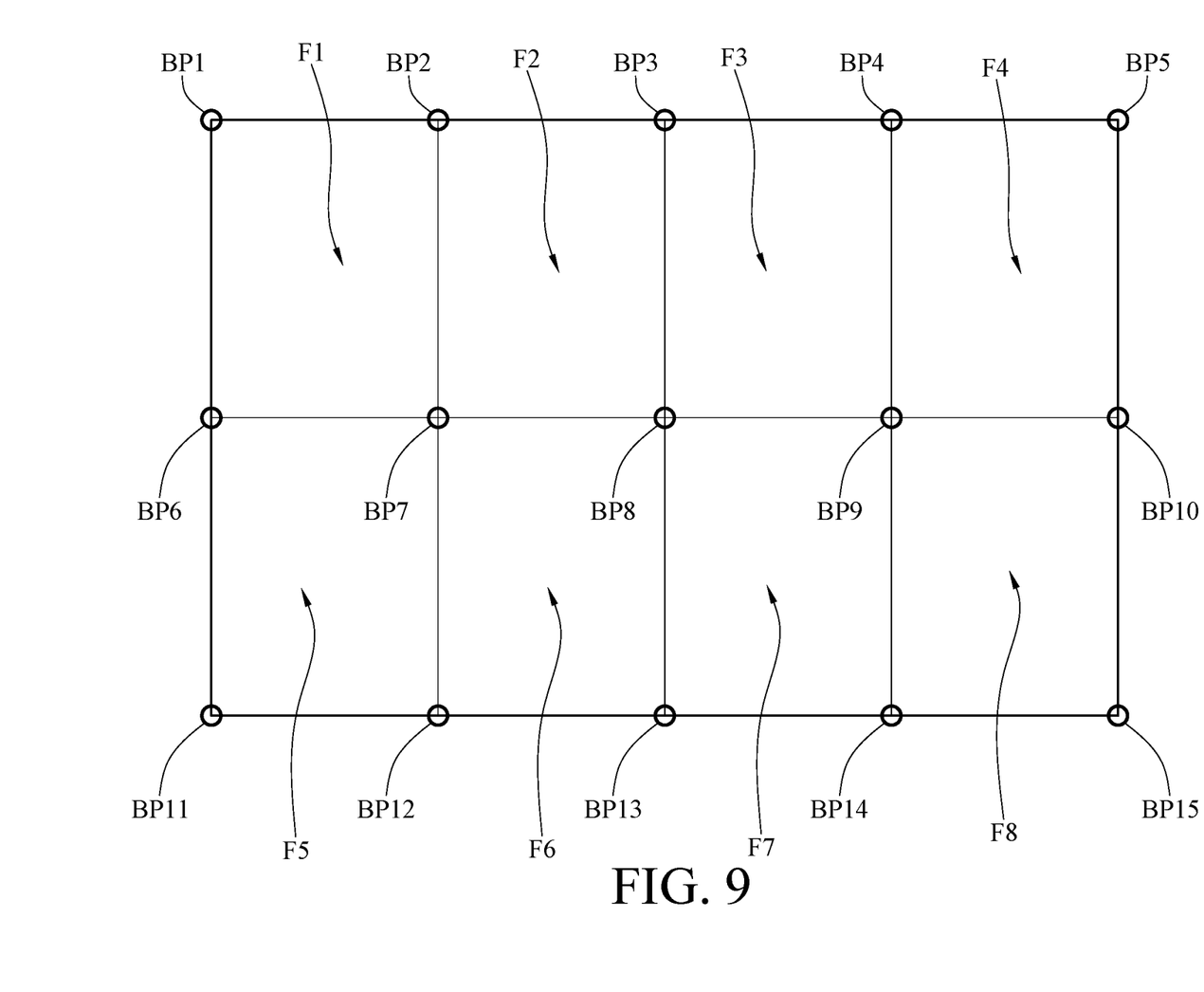
FIG. 9 is a schematic diagram of a design image of a workpiece according to one embodiment of the present disclosure.

Please refer to FIG. 8 and FIG. 9. FIG. 8 is a flow chart of a method for compensating a design image of a workpiece according to another embodiment of the present disclosure. FIG. 9 is a schematic diagram of a design image of a workpiece according to one embodiment of the present disclosure. Step S1'-S4' and step S6'-S7' as shown in FIG. 8 are identical or similar to steps S1-S4 and steps S5-S6 as shown in FIG. 2, FIG. 4A and FIG. 4B. The method of FIG. 8 further includes step S5' and step S6' includes step S61' and S62'.

In step S5', the first processor 10 divides the design image of the workpiece into a plurality of sub-images F1-F8 according to a plurality of predetermined registration holes. Specifically, the first processor 10 uses multi-thread to divide the design image into the plurality of sub-images F1-F8 according to a plurality of predetermined registration holes BP1-BP15. In this embodiment, the predetermined registration holes correspond to the preset positions of the design image (original circuit image), with the preset positions indicating the registration holes of a standard workpiece. The first processor 10 stores the sub-images F1-F8 in the first memory 12 in a continuous manner, wherein the sub-images F1-F8 correspond to the above-mentioned blocks E1-E8 respectively. In the embodiment of FIG. 8, step S5' is performed after step S4'. However, in other embodiments, steps S5' is performed before step S1', or steps S5' is performed between any two of steps S1'-S4'.

Step S6' of compensating the design image of the workpiece according to the positions of the plurality of control points for generating the mapping image includes step S61' and S62'. In step S61', the second processor 140 compensates a respective one of the plurality of sub-images according to the positions of each four registration holes, the positions of the interpolation points between two neighboring registration holes of each four registration holes, and the positions of the control points in the block formed by each four registration holes. Specifically, the second processor 140 sequentially reads the sub-images F1-F8 from the first memory 12 and compensates the sub-images F1-F8 respectively according to the registration holes, the interpolation points and the control points of the blocks E1-E8 obtained by the first processor 10. For example, the second processor 140 compensates the sub-image F4 according to the control points as well as the registration holes and the interpolation points of the block E4 shown in FIG. 7. More specifically, since the block E4 has the total amount of 60 points which include the registration holes, the interpolation points and the control points, the block E4 can be divided into 45 sub-blocks. Accordingly, the second processor 140 further divides the sub-image F4 into 45 small images. According to positions of four points surrounding each sub-block of the block E4, the second processor 140 adjusts positions of four points surrounding a respective small image of the sub-image F4. Thereby, the image compensation could be achieved.

Figure 10:
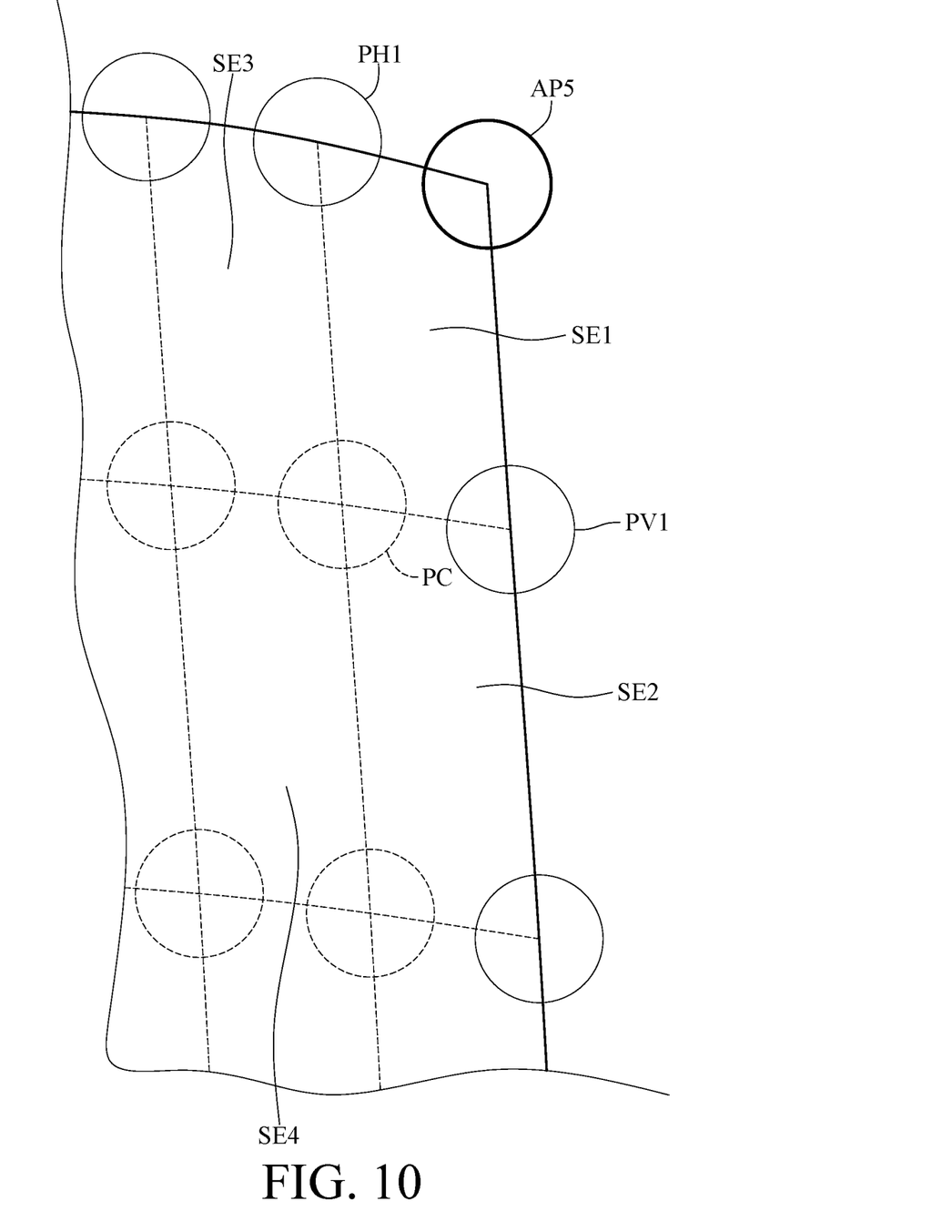
FIG. 10 is a partial enlarged schematic diagram of a block on the real image according to one embodiment of the present disclosure.

For illustrating the above-mentioned compensation for images in detail, please refer to FIG. 10, which is a partial enlarged schematic diagram of a block on the real image according to one embodiment of the present disclosure. Specifically, FIG. 10 illustrates a partial enlarged diagram of the block E4, which has four sub-blocks SE1-SE4 among the above-mentioned 45 sub-blocks. In this embodiment, the second processor 140 adjusts four points surrounding a respective small image of the sub-image F4 according to the four points surrounding the sub-block SE1, which are the registration hole AP5, the interpolation points PH1, and PV1 and the control point PC.

In addition, the second processor 140 adjusts positions of four points surrounding a respective small image of the sub-image F4 according to four points surrounding the sub-block SE2, which are the two interpolation points PV1 and the two control points PC. The second processor 140 adjusts positions of four points surrounding a respective small image of the sub-image F4 according to four points surrounding the sub-block SE3, which are the two interpolation points PH1 and the two control points PC. The second processor 140 adjusts positions of four points surrounding a respective small image of the sub-image F4 according to four points surrounding the sub-block SE4, which are the four control points PC. The same way of point adjustment can be applied to other respective small images of the sub-image F4, and not repeated herein.

In one embodiment, the second processor 140 uses the hardware acceleration (e.g. OpenGL and/or DirectX) to perform the compensation to each of the sub-images F1-F8. The second processor 140 further stores the sub-images F1-F8 which have been compensated in the second memory 141 in a continuous manner. Then, the first processor 10 obtains the sub-images F1-F8 which have been compensated from the second memory 141. In step S62', the first processor 10 rearranges the sub-images F1-F8 which have been compensated for generating the mapping image.

In view of the above description, in the method for compensating the design image of the workpiece and the system for processing the design image of the workpiece disclosed in the present disclosure, by taking the characteristic of the geometric continuity of the workpiece surface, the interpolation points and the control points corresponding to each block are obtained by the polynomial equations and the slope values of the registration holes of the workpiece, and each of the sub-images of the design image is compensated according to the interpolation points and the control points corresponding to the respective block. By using the method disclosed in the present disclosure, it is possible to compensate the positions where distortions occur due to a situation of expansion or shrinkage. Accordingly, the implementation of the method not only maintains a high-accuracy of the workpiece, but also saves manufacturing time for improving the efficiency. Thereby, the purposes of the improved manufacturing efficiency and the high workpiece accuracy are both achieved.

The foregoing description, for the purpose of explanation, has been described with reference to specific embodiments.

However, the illustrative discussions above are not intended to limit the invention to the precise forms as disclosed. Many modifications and variations are possible in view of the above teachings. Accordingly, the present embodiments are to be considered as illustrative and not restrictive, and the invention is not to be limited to the details given herein, but may be modified within the scope and equivalents of the appended claims.

What is claimed is:

1. A method for compensating a design image of a workpiece, comprising:
   obtaining a real image of the workpiece, with the real image having a plurality of registration holes;
   calculating a slope value for each of the plurality of registration holes;
   determining an amount of interpolation points between each two neighboring registration holes of the plurality of registration holes according to the slope value corresponding to each of the plurality of registration holes;
   obtaining positions of a plurality of control points in a plurality of blocks formed by the plurality of registration holes, wherein each of the plurality of blocks is surrounded by first registration holes of the plurality of registration holes, each of the plurality of blocks comprises first control points of the plurality of control points, and an amount of the first control points located in each of the plurality of blocks is associated with an amount of first interpolation points between the first registration holes which surround the block;
   compensating the design image of the workpiece according to positions of the plurality of registration holes, positions of the interpolation points and the positions of the plurality of control points for generating a mapping image; and
   outputting the mapping image adapted to be mapped onto the workpiece.

2. The method for compensating the design image of the workpiece according to claim 1, wherein determining the amount of the interpolation points between each two neighboring registration holes of the plurality of registration holes according to the slope value corresponding to each of the plurality of registration holes comprises:
   calculating a slope-value difference of each two neighboring registration holes of the plurality of registration holes according to the slope value corresponding to each of the plurality of registration holes;
   obtaining a non-zero minimum slope-value difference from the plurality of slope-value differences; and
   determining the amount of the interpolation points between each two neighboring registration holes of the plurality of registration holes according to the non-zero minimum slope-value difference.

3. The method for compensating the design image of the workpiece according to claim 2, wherein determining the amount of the interpolation points between each two neighboring registration holes of the plurality of registration holes according to the non-zero minimum slope-value difference comprises:
   dividing the slope value of each two neighboring registration holes of the plurality of registration holes by the non-zero minimum slope-value difference to determine the amount of the interpolation points between each two neighboring registration holes of the plurality of registration holes.

4. The method for compensating the design image of the workpiece according to claim 1, wherein obtaining the positions of a plurality of control points in the plurality of blocks formed by the plurality of registration holes comprises:
   obtaining a maximum amount of the interpolation points which is in a horizontal direction and another maximum amount of the interpolation points which is in a vertical direction corresponding to the block formed by each four neighboring registration holes of the plurality of registration holes;
   obtaining the positions of the interpolation points corresponding to the block formed by each four neighboring registration holes of the plurality of registration holes according to the maximum amount of the interpolation points which is in the horizontal direction and the another maximum amount of the interpolation points which is in the vertical direction; and
   calculating the positions of the control points in the block formed by each four neighboring registration holes of the plurality of registration holes according to the positions of the interpolation points.

5. The method for compensating the design image of the workpiece according to claim 4, wherein calculating the positions of the control points in the block formed by each four neighboring registration holes of the plurality of registration holes according to the positions of the interpolation points comprises:
   calculating a plurality of horizontal polynomial equations and a plurality of vertical polynomial equations corresponding to the block formed by each four neighboring registration holes of the plurality of registration holes according to the positions of the control points; and
   obtaining a plurality of intersection points of the plurality of horizontal polynomial equations and the plurality of vertical polynomial equations, wherein positions of the plurality of intersection points corresponding to the positions of the control points.

6. The method for compensating the design image of the workpiece according to claim 1, further comprising:
   dividing the design image of the workpiece into a plurality of sub-images according to a plurality of predetermined registration holes;
   wherein compensating the design image of the workpiece according to the positions of the plurality of registration holes, the positions of the interpolation points and the positions of the plurality of control points for generating the mapping image comprises:
   compensating a respective one of the plurality of sub-images according to the positions of each four registration holes, the positions of the interpolation points between two neighboring registration holes of each four registration holes and the positions of the control points in the block formed by each four registration holes; and
   rearranging the plurality of sub-images which are compensated for generating the mapping image.

7. A system for processing a design image of a workpiece, comprising:
   a processor configured to divide the design image of the workpiece into a plurality of sub-images;
   a memory coupled to the processor, with the memory configured to store the plurality of sub-images; and
   a computing assembly coupled to the processor, with the computing assembly configured to compensate the plurality of sub-images according to positions of a plurality of registration holes, positions of a plurality of interpolation points and positions of a plurality of control points, and the computing assembly further configured to store the plurality of sub-images which are compensated;

wherein the processor rearranges the plurality of sub-images which are compensated to generate a mapping image, and the processor is programmed for:

obtaining a real image of the workpiece, with the real image having a plurality of registration holes;

calculating a slope value for each of the plurality of registration holes;

determining an amount of the interpolation points of the plurality of interpolation points between each two neighboring registration holes of the plurality of registration holes according to the slope value corresponding to each of the plurality of registration holes; and obtaining the positions of the plurality of control points in a plurality of blocks formed by the plurality of registration holes, wherein each of the plurality of blocks is surrounded by first registration holes of the plurality of registration holes on the real image, each of the plurality of blocks comprises first control points of the plurality of control points, and an amount of the first control points located in each of the plurality of blocks is associated with an amount of first interpolation points between the first registration holes which surround the block.

8. The system for processing the design image of the workpiece according to claim 7, wherein the processor calculates a slope-value difference of each two neighboring registration holes of the plurality of registration holes according to the slope value corresponding to each of the plurality of registration holes, obtains a non-zero minimum slope-value difference from the plurality of slope-value differences, and further determines the amount of the interpolation points between each two neighboring registration holes of the plurality of registration holes according to the non-zero minimum slope-value difference.

9. The system for processing the design image of the workpiece according to claim 8, wherein the processor divides the slope value of each two neighboring registration holes of the plurality of registration holes by the non-zero minimum slope-value difference to determine the amount of the interpolation points between each two neighboring registration holes of the plurality of registration holes.

10. The system for processing the design image of the workpiece according to claim 7, the processor obtains a maximum amount of the interpolation points which is in a horizontal direction and another maximum amount of the interpolation points which is in a vertical direction corresponding to the block formed by each four neighboring registration holes of the plurality of registration holes, obtains the positions of the interpolation points corresponding to the block formed by each four neighboring registration holes of the plurality of registration holes according to the maximum amount of the interpolation points which is in the horizontal direction and the another maximum amount of the interpolation points which is in the vertical direction, and further calculates the positions of the control points in the block formed by each four neighboring registration holes of the plurality of registration holes according to the positions of the interpolation points.

11. The system for processing the design image of the workpiece according to claim 10, the processor calculates a plurality of horizontal polynomial equations and a plurality of vertical polynomial equations corresponding to the block formed by each four neighboring registration holes of the plurality of registration holes according to the positions of the control points, and obtains a plurality of intersection points of the plurality of horizontal polynomial equations and the plurality of vertical polynomial equations, wherein positions of the plurality of intersection points corresponding to the positions of the control points.

* * * * *